(No Model.)
C. G. TURNER.
COUPLING FOR VEHICLES.
No. 535,427. Patented Mar. 12, 1895.
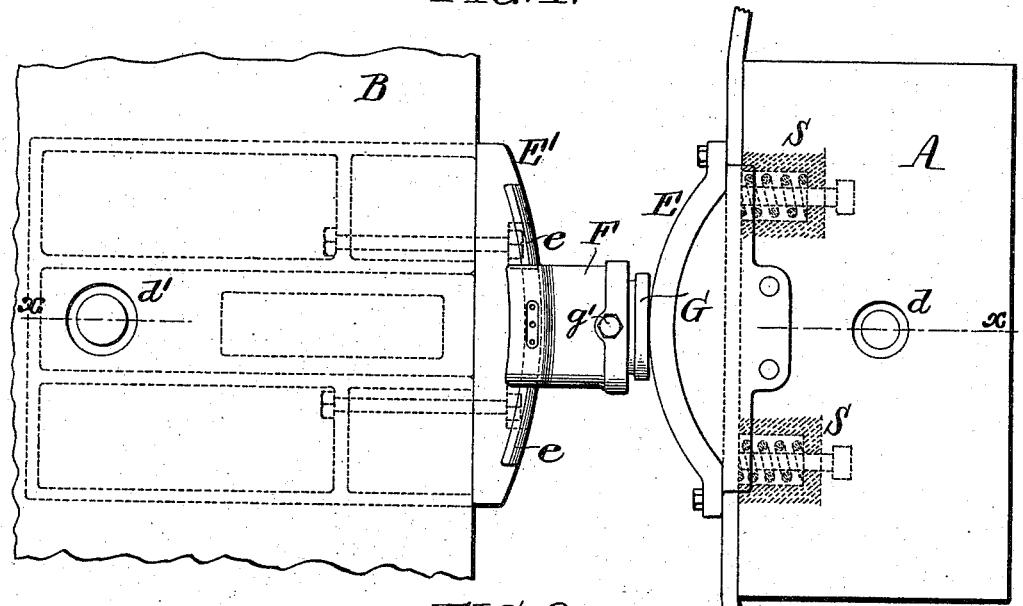
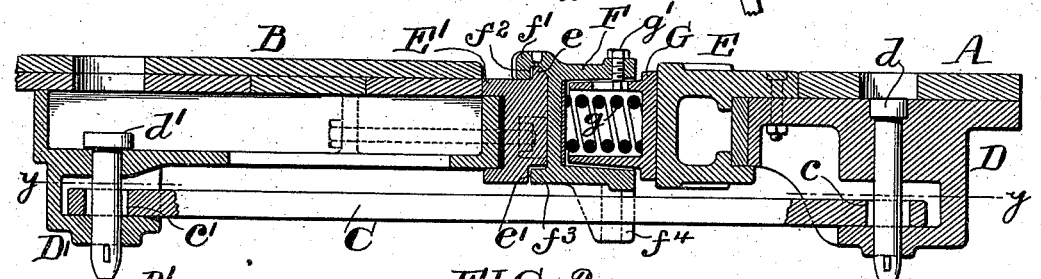
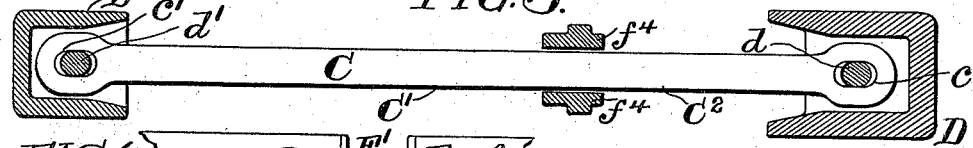
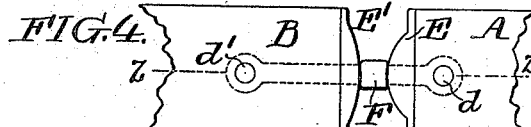
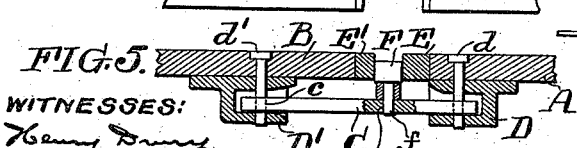
WITNESSES:
Henry Drury
Edw. F. Ayres.
INVENTOR:
Calvin G. Turner
by his atty.
Francis T. Chambers

UNITED STATES PATENT OFFICE.

CALVIN G. TURNER, OF WILMINGTON, DELAWARE.

COUPLING FOR VEHICLES.

SPECIFICATION forming part of Letters Patent No. 535,427, dated March 12, 1895.

Application filed May 24, 1894. Serial No. 512,272. (No model.)

*To all whom it may concern:*

Be it known that I, CALVIN G. TURNER, a citizen of the United States, residing at Wilmington, in the county of New Castle, in the State of Delaware, have invented a new and useful Improvement in Couplers for Vehicles, of which the following is a true and exact description, reference being had to the accompanying drawings, which form a part thereof.

My invention relates to couplers for vehicles, and has for its main object to provide a coupler which will not bind when the rear vehicle is being backed on a short curve by the one in front.

Heretofore couplers have been provided which will operate satisfactorily when the vehicles are going ahead, or when backing on a straight track, but when curves are encountered, particularly such short curves as are often necessary in switch or coal yards, these couplers will bind and often tear, or at least, strain the abutting platforms of the vehicles which are coupled. To overcome this binding, and to provide a coupler through which the power of the engine may be directly and effectively transmitted when backing, my invention consists in providing a block which is adapted to separate the two vehicles, and so securing this block to a connection, consisting of a bar pivoted at its ends to each vehicle, that its position will be changed between the vehicles as they change their directions relatively to each other, as in rounding curves.

My invention will be best understood as explained in connection with the accompanying drawings, in which—

Figure 1 is a plan view of parts of two vehicles provided with my improved coupler. Fig. 2 is a sectional elevation on the line $x$—$x$ of Fig. 1. Fig. 3 is a view, on the line $y$—$y$ of Fig. 2, of the connection for securing the vehicles together, which connection consists of a bar or bars. This figure also shows the preferred lost motion device in the bar. Fig. 4 is a view, similar to that shown in Fig. 1, illustrating a simple form of my device. Fig. 5 is a section on the line $z$—$z$ of Fig. 4, and Fig. 6 is a view showing the action of my improved coupler in rounding a sharp curve.

A B are two vehicles, of which the adjacent ends only are shown.

C is a bar pivoted at its ends to one of the vehicles.

D D' are sockets on the vehicles A B, respectively, and $d\ d'$ coupling pins of ordinary construction, which are adapted to engage with the holes $c\ c'$, in the bar C. These holes are, preferably made slightly elongated, or slotted, as shown, and provide a lost motion device so that, when the rear vehicle is being backed by the one in front, no power will be transmitted through the bar. Any other suitable lost motion device may, of course, be used instead of the slotted holes.

F is a block or buffer, which is adapted to separate the vehicles, and through which the power is transmitted when the rear vehicle is being backed by the one in front.

It has, of course, been customary to provide a buffer, which is secured to the platform of the car, but when a short curve is encountered, and the cars take a position such as is shown in Fig. 6, the ordinary buffer on one of the vehicles would only engage at its edge with the other vehicle, and when a straight length of track is reached would be apt either to bind or to tear the platform of the other vehicle. In my construction, however, the block or buffer F is movably supported between the vehicles, and is so secured to the coupler bar C, that its position is changed as the vehicles change their position relatively to each other.

In Figs. 4 and 5, which show my device in substantially its simplest form, the block F is shown supported on a stem $f$, which is secured in the rod or bar C, and bears against the curved guides or abutments E E' on the vehicles A B, respectively, it will be noted that, as the vehicles swing around a curve that the block is kept by the bar C in such a position between the vehicles that it will most directly transmit the power, and, at the same time, it will not bind, since it always bears directly against the guides E E'.

In order to get the best results, I prefer to make the guide or abutment E' of a curvature which is that of a circle whose center is substantially at the pivotal point $d'$ of the bar C, and the guide E of a curvature which is that of a circle whose center is at the pivotal point $d$ of the bar. This permits the block to swing around freely and yet always be in engagement with the guides E E'.

Instead of securing the block F on the bar C, I prefer, for practical construction, the arrangement shown in Figs. 1 and 2, where the block is movably secured to one of the platforms. This is conveniently done by arranging a flange $e$ on the guide or abutment E' with which a flange $f'$ on the block F engages, this flange $f'$ having a groove $f^2$ which fits the flange $e$. A flange $f^3$ on the lower part of the block also engages with a groove or slot $e'$ on the guide E' so as to prevent the block from being lifted from engagement with the guide. The flange $e$ does not extend the full length of the guide so that the block can be slid off the end of the guide when it is desired to remove it. I prefer also to arrange a spring pressed box, as G, so that shocks may be taken up. This is shown as sliding in a suitable opening in the block F. $g$ are springs for pressing the box G against the guide E, and $g'$ is a pin to keep the box from falling out of the block when the vehicles are uncoupled. It is also possible to give one or both of the abutments a spring connection with the vehicle to which it is secured. This is shown in dotted lines in Fig. 1, where S S are springs which bear against the guide E.

In operation, and when the rear vehicle is being drawn, the coupling bar C bears all the strain, the abutment block F serving simply to steady the vehicles and prevent their bumping together. In backing, however, the slots $c'$ or other lost motion device permits the bar C to be entirely free from all traction stresses, the entire power being transmitted through the block F, which is moved from side to side by the rod, in its movement with the vehicles, so that power is always transmitted directly through the block, its faces bearing directly against the guides E E' in whatever position the cars may assume. It will also be noted that the power when one vehicle is being backed by the other is transmitted in substantially the same lines as it is when the rear vehicle is being drawn by the one in front. When a single bar is employed which is pivoted at its ends to both vehicles the block is kept very exactly in the most effective position to transmit the strains.

The rear of the block may be curved so as to conform to the shape of the guide on which it is supported, and the front of the block, or the face of the box G, may be shaped to conform to that of the guide against which it bears, if desired. Any suitable connection may be provided by which the block may be moved by the coupling rod. A very convenient mode is shown in Figs. 2 and 3 where $f^4$ are downwardly projecting lugs on the block which straddle the bar C.

I may remark that while my coupler may be advantageously used to couple any sort of cars or vehicles, it is especially useful in coupling a locomotive and tender, particularly such as are used in switch yards or other places where sharp turns have to be made.

It will be noted that in the drawings I have shown the distance from the edge of the platform of the vehicle A to the pivot pin $d$ as less than the distance from the edge of the platform on the vehicle B to the pivot pin $d'$. This, it will be noted, is generally the case in locomotive and tender couplings, since the position of the fire-box makes it necessary to pivot the coupler on the locomotive near the edge of the platform.

By my construction, where the guides E E' are curved from the points $d\ d'$ as centers, and the block F' interposed between the two, no binding occurs, and power is directly transmitted even in such an exaggerated position as is illustrated in Fig. 6.

Having now described my invention, what I claim as new, and desire to secure by Letters Patent, is—

1. A coupler for vehicles consisting of a connecting bar pivoted at its ends to each vehicle, a block for separating the vehicles when one is backed by the other and a connection between the block and the connecting bar whereby the block will be maintained in such a position that the power will be transmitted in substantially the same lines when one vehicle is being backed by the other as it is when the rear vehicle is being drawn by means of the coupler bar.

2. A coupler for vehicles consisting of a single bar pivoted at its ends to each vehicle, a block movably supported on one vehicle, and adapted to separate the vehicles, and a connection between the pivoted bar and the block whereby the position of said block relatively to the two vehicles is changed by the movement of the bar when one of the vehicles changes its direction relatively to the other so that when one vehicle is being backed by the other the power will be transmitted in substantially the same lines as if the rear vehicle were being drawn by means of the coupler connection.

3. A coupler for vehicles, consisting of a bar pivoted at its ends to each vehicle, a curved guide or abutment on each vehicle, the center of curvature of each guide being substantially the pivotal point of the bar on that vehicle, a block supported on one of the guides and adapted to abut against the other and separate the vehicles, and a connection between the pivoted bar and the block whereby the position of the said block relatively to the two vehicles is changed as described by the movement of the bar as one of the vehicles changes its direction relatively to the other.

4. In a coupler for vehicles, a single bar pivoted at its ends to each vehicle whereby one vehicle can be drawn by the other through the medium of the bar, a block separating the vehicles and movably supported between them a connection from the block to the bar whereby the position of the block will be changed by the bar as described as this bar is moved as one vehicle changes its direction relatively to the other, and a lost motion device in the bar or its pivoted connection whereby there will be no strain borne by said bar when the rear vehicle is being backed by the front one.

5. The combination with two vehicles, each of which is provided with a suitably curved guide or abutment, of a block movably supported on one of the guides, and adapted to abut against the other and separate the vehicles, a connection, consisting of a bar pivoted at its ends to both vehicles, means for securing the block to the connecting bar whereby its position will be changed thereby, as described, and a spring or springs interposed between the guide on one vehicle and the support for the guide on the other, whereby shocks will be taken up.

6. A vehicle coupler, consisting of two curved guides or heads, one secured to each of the vehicles coupled a block movably secured to one guide, a spring buffer secured to the block and adapted to abut against the other guide whereby the vehicles are separated, a coupler connection pivotally secured to the vehicles back of the guides, and means for operating the block from the connection so that when one vehicle is being backed by the other the power will be transmitted in substantially the same lines as if the rear vehicle were being drawn by means of the coupler connection.

7. A vehicle coupler, consisting of two curved guides or heads, one secured to each of the vehicles coupled, a block movably secured to one guide, a spring buffer secured to the block and adapted to abut against the other guide whereby the vehicles are separated, a bar C pivotally secured to each vehicle and means for operating the block from the bar C substantially for the purpose specified.

8. A vehicle coupler, consisting of two curved guides or heads, one secured to each of the vehicles coupled, a block movably secured to one guide, a spring buffer secured to the block and adapted to abut against the other guide whereby the vehicles are separated, lugs $f^4$ on the block, a bar C pivoted to each vehicle and adapted to engage with the lugs and operate the block, substantially as specified.

9. A vehicle coupler, consisting of two curved guides or heads one secured to each of the vehicles coupled, a block movably secured to one guide, a spring buffer secured to the block and adapted to abut against the other guide whereby the vehicles are separated, lugs $f^4$ on the block, a bar C pivoted to each vehicle at points which are substantially at the centers of curvature of the guides and adapted to engage with the lugs and operate the block, substantially as specified.

10. In a vehicle coupler, curved guides secured to each of the vehicles coupled, a bar pivotally secured to each vehicle at points which are substantially at the centers of the curvature of the guides, a block for separating the vehicles, means for operating the block from the bar, substantially for the purpose specified, and a spring or springs between one or both of the guides, and the vehicle which carries it whereby shocks will be taken up.

CALVIN G. TURNER.

Witnesses:
HENDERSON WEIR,
JAMES B. CLARKSON.